United States Patent
Lloyd et al.

(10) Patent No.: US 8,984,034 B2
(45) Date of Patent: Mar. 17, 2015

(54) CALCULATION ENGINE AND CALCULATION PROVIDERS

(75) Inventors: Chad Andrew Lloyd, Old Hickory, TN (US); Jason D. McClanahan, Murfreesboro, TN (US); John Jeffrey Dodson, Murfreesboro, TN (US); Jeffrey W. Yeo, Saanichton (CA); Marcus E. Little, Victoria (CA); Yixiong Zheng, Brentwood, TN (US); Theresa K. Wall, Murfreesboro, TN (US); Coni Christine Wimsatt, Smyrna, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 1070 days.

(21) Appl. No.: 12/892,504

(22) Filed: Sep. 28, 2010

(65) Prior Publication Data
US 2012/0078944 A1    Mar. 29, 2012

(51) Int. Cl.
| G06F 7/00 | (2006.01) |
|---|---|
| G06F 17/00 | (2006.01) |
| G06F 17/30 | (2006.01) |
| G05B 23/02 | (2006.01) |

(52) U.S. Cl.
CPC .................................. *G05B 23/027* (2013.01)
USPC ............................................. 707/899; 705/41

(58) Field of Classification Search
USPC .................. 707/899, 769; 705/4, 412, 35, 41; 717/128, 168; 713/164; 726/26
See application file for complete search history.

(56) References Cited

U.S. PATENT DOCUMENTS

| 6,029,174 A * | 2/2000 | Sprenger et al. .................... 1/1 |
| 7,171,693 B2 * | 1/2007 | Tucker et al. .................. 726/26 |

(Continued)

FOREIGN PATENT DOCUMENTS

GB        2456019 A        1/2009

OTHER PUBLICATIONS

International Search Report corresponding to co-pending International Patent Application Serial No. PCT/US2011/053568, European Patent Office, dated Jan. 11, 2012; (5 pages).

(Continued)

*Primary Examiner* — Susan Chen
(74) *Attorney, Agent, or Firm* — Lando & Anastasi, LLP

(57) ABSTRACT

A method of acquiring data and performing calculations on the data using a provider service. A provider ticket service (PTS) receives tickets from one or more clients. Each ticket includes a calculation identifier and a payload. The calculation identifier identifies a calculation to be performed using information in the payload. The PTS associates a unique ticket identifier with each ticket. A ticket manager submits a selected ticket from the PTS to a provider host service (PHS), which determines which provider is to perform the calculation identified by the selected ticket by inspecting provider identification information in the selected ticket. The PHS launches a provider host thread (PHT) that invokes the provider determined to perform the calculation identified by the calculation identifier of the selected ticket. The provider performs the calculation and returns its result to the PHS, which passes the result back to the PTS, which returns the result to the requesting client.

25 Claims, 9 Drawing Sheets

(56) References Cited

U.S. PATENT DOCUMENTS

| | | | |
|---|---|---|---|
| 7,859,392 B2* | 12/2010 | McClellan et al. | 340/441 |
| 8,196,131 B1* | 6/2012 | von Behren et al. | 717/168 |
| 8,412,933 B1* | 4/2013 | Pelly et al. | 713/164 |
| 2003/0236748 A1* | 12/2003 | Gressel et al. | 705/41 |
| 2004/0225625 A1* | 11/2004 | Van Gorp et al. | 705/412 |
| 2005/0027871 A1 | 2/2005 | Bradley et al. | |
| 2007/0203760 A1* | 8/2007 | Schmidt et al. | 705/4 |
| 2010/0017783 A1 | 1/2010 | Brininstool et al. | |
| 2010/0107142 A1* | 4/2010 | Chilimbi et al. | 717/128 |
| 2010/0138363 A1* | 6/2010 | Batterberry et al. | 705/412 |

OTHER PUBLICATIONS

International Written Opinion corresponding to co-pending International Patent Application Serial No. PCT/US2011/053568, European Patent Office, dated Jan. 11, 2012; (9 pages).

Windows HPC Server 2008—Overview of SOA ProgrammingModel and Runtime System for Windows HPC Server 2008; XP55015077, Microsoft Corporation; Dated May 31, 2008 (56 pages).

* cited by examiner

CALCULATION ENGINE AND CALCULATION PROVIDERS

FIELD OF THE INVENTION

The present disclosure relates generally to service-oriented architectures (SOAs), and more particularly, to a provider service within a network service provider service-oriented architecture with scriptable, extensible, and customizable calculation engines.

BACKGROUND

Power management software collects data measured by various monitoring devices in a power monitoring system, such as power meters, and analyzes the measured data to help a facility operator lower energy-related costs, avoid downtime by allowing the operator to respond quickly to alarms to avoid critical situations, and optimize equipment utilization by identifying opportunities for increasing efficiency, for example. This software typically runs on a server or a workstation that collects the measured data over a network. Functionality in the form of modules can be provided with the software, but the software is not particularly scalable, extensible, and customizable. Adding new modules to perform different calculations on measured data is presently a time and labor intensive task, particularly by third parties. A lack of centrally managed processing of requested calculations leads to duplicative storage and calculations, and a non-cohesive coordination and management of tasks, which delays the ultimate reporting of relevant, meaningful information to the facility operator and results in inefficient use of processing and memory resources.

BRIEF SUMMARY

According to an aspect of the present disclosure, a method is disclosed of acquiring data and performing calculations on the data using a provider service. The method includes: receiving, at a provider ticket service, a plurality of tickets from one or more clients, each of the tickets including a calculation identifier and a payload, the calculation identifier identifying a calculation to be performed using at least information indicated in the payload of the ticket; for each of the tickets received at the provider ticket service, associating a unique ticket identifier with each of the corresponding tickets; a ticket manager submitting the selected ticket from the provider ticket service to a provider host service; determining which one or more of a plurality of providers is to perform the calculation identified by the calculation identifier of the selected ticket; the provider host service launching at least one provider host thread that invokes or instantiates the one or more providers determined to perform the calculation identified by the calculation identifier of the selected ticket; receiving at the provider ticket service from the provider host service a result of the calculation carried out by the invoked one or more providers; and returning the result to the requesting client associated with the selected ticket.

The method can further include, prior to performing the calculation requested by the selected ticket, determining whether the calculation requested by the selected ticket has been performed already, and, if so, retrieving the previously calculated result and returning the previously calculated result as the result to be returned to the requesting client associated with the selected ticket. The method can further include storing the previously calculated result in a data store of the provider ticket service. The method can further include, prior to performing the calculation requested by the selected ticket, determining whether another of the providers is in the process of performing the calculation requested by the selected ticket, and if so, waiting for the other provider to perform the calculation and provide the result and returning the result from the other provider as the result to be returned to the requesting client associated with the selected ticket. The method can further include: determining whether to store the result based on at least one criterion; and responsive to the at least one criterion being satisfied, storing the result in a data store of the provider ticket service.

The at least one criterion can include: (a) whether the calculation requested by the selected ticket has been requested by at least one other of the clients; (b) a frequency with which the result is expected to be requested or has been requested; or (c) whether data used to perform the calculation is within a predetermined time period. The criterion can also or alternately be based on how frequently the calculation requested by the selected tickets is requested by other clients of the one or more clients.

The method can further include: receiving, from the client that provided the first ticket, a request for the result using the ticket identifier associated with the first ticket; and responsive to receiving the request from the requesting client, querying the data store for the result. The method can further include inserting into the selected ticket a provider identification that identifies which of the one or more of providers is to be invoked for carrying out the calculation identified by the calculation identifier of the selected ticket. The method can further include communicating to the client that communicated the selected ticket the ticket identifier associated with the selected ticket. The method can further include: receiving from the one or more clients a request for a status of the selected ticket; responsive to receiving the request for the status of the selected ticket, the provider ticket service querying a ticket status table for the status of the selected ticket; and the provider ticket service communicating, to the client that requested the status of the selected ticket, the status of the selected ticket, the status including an indication of whether processing of the selected ticket is pending or in-progress, and if the status of the selected ticket is in-progress, the ticket provider service further communicating an indication as to how much processing has been completed or remains to be completed to produce the result. The invoked provider can carry out the calculation to be performed using input data hosted locally by the provider host service or externally to the provider host service based at least in further part on the local or external data.

The method can further include: the invoked provider requesting the information indicated in the payload of the ticket from a data store hosted by the provider ticket service or from a data service hosted external to the provider host service and to the provider ticket service; and responsive to the invoked provider requesting the information, the invoked provider receiving input data from the data store or external data service and using the received input data to perform the calculation requested by the selected ticket. The method can further include: storing, using a ticket manager, the tickets in a ticket store according to a queue; identifying a status of each of the tickets and storing an indication of the status of each of the tickets, including the selected ticket, in a ticket status table; increasing a pending ticket counter each time the status of selected ones of the tickets is identified as pending; querying the ticket store for a first one of the tickets at the front of the queue; and identifying from the first ticket at least a provider to be invoked from the plurality of providers for carrying out the calculation indicated by the calculation identifier of the first ticket.

The method can further include, responsive to receiving the selected ticket at the provider ticket service, updating the status of the selected ticket in the ticket status table from pending to in-progress. The method can further include: storing the result in a data store of the provider ticket service; and responsive to storing the result in the data store of the provider ticket service, updating the status of the selected ticket in the ticket status table from in-progress to completed.

Each of at least some of the tickets can further include a priority field indicating a priority order of invocation relative to the other tickets, the first ticket including a higher priority order in the corresponding priority field compared to at least some of the other tickets. The method can further include, responsive to returning the result to the client associated with the selected ticket, deleting the selected ticket from the ticket store and deleting the status of the selected ticket from the ticket status table. The method can further include: receiving, at the provider ticket service, a request to cancel one of the tickets; the provider ticket service determining which of the providers to notify based on provider identification information in the ticket to be canceled; notifying the provider determined to be associated with the ticket to be canceled that the ticket to be canceled has received the request to cancel; and canceling the ticket to be canceled.

The method can further include, responsive to receiving the plurality of tickets at the provider ticket service, formatting each of the tickets by an extensible markup language (XML) or into a JavaScript Object Notation (JSON) format. The payload can include a set of inputs or parameters needed to perform the calculation associated with the calculation identifier. The set of inputs or parameters can include a source identification indicating a source of at least some of the data needed to perform the calculation associated with the calculation identifier.

The method can further include: the invoked provider associated with the selected ticket carrying out the calculation to be performed as indicated by the calculation identifier of the selected ticket based at least in part on the payload of the selected ticket; and responsive to the carrying out the calculation, the invoked provider outputting the result of the calculation associated with the selected ticket. The method can further include: the provider host service further hosting the one or more providers determined to perform the calculation identified by the calculation identifier of the selected ticket. The method can further include: the provider host service notifying the provider ticket service how many provider host threads are available to perform calculations requested by the tickets.

The launching the at least one provider host thread can include invoking a plurality of providers and chaining the plurality of providers together, some of the chained providers performing an intermediate calculation and producing an intermediate result to produce the result as the result to be returned to the requesting client associated with the selected ticket. The method can further include reading a configuration file to determine how to chain together the chained providers, the configuration file indicating at least a sequence order of processing each of the chained providers. The method can further include storing the intermediate result on a data store that is hosted local to the provider ticket service.

The selected ticket can include a source identification, a topic identification, and a date or a date range, the source identification identifying a source of data used to perform the calculation identified by the calculation identifier of the selected ticket, the topic information identifying topical information about the data from the source identification, and the date or date range corresponding to a date or date range of the topical data from the source of the data. The selected ticket can further include a dependency identification associated with the source identification and the topic identification, the dependency identification having a unique value relative to dependency identifications associated with every other one of the tickets to permit multiple instances of the same source-topic combinations having the same source identification and the same topic identification. The dependency identification can identify one of a plurality of time-of-use (TOU) schedules, each of the TOU schedules being associated with the same source identification and the same topic identification, the calculation determining a time-of-use (TOU) pricing or an energy usage based on the TOU schedule identified by the dependency identification. The information can include values indicative of or calculated from a characteristic of a utility that is measured by one or more intelligent electronic devices in a utility system.

The utility can be water, air, gas, electricity, or steam. For example, the utility can be electricity and the characteristic can include current or voltage. The values calculated from the current or voltage can include energy. The provider ticket service can be hosted on a computing machine and the provider host service is hosted on the computing machine. The provider host service can include a plurality of provider host services, the provider ticket service being hosted on a computing machine and at least some of the plurality of provider host services being hosted on other computing machines communicatively coupled to the computing machine that hosts the provider ticket service. The method can further include associating a Uniform Resource Identifier (URI) with the provider host service.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

The present disclosure specifies a software architecture, such as a network service provider service-oriented (SOA) architecture, with scriptable, extensible, and customizable calculation engines that are pluggable into the SOA architecture to extend the types of calculations and data that a Provider Service (PS) 100 offers. The Provider Service 100 can be used for analyzing information from a utility system. This information includes values indicative of or calculated from a characteristic of a utility that is measured by one or more intelligent electronic devices in the utility system. The utility can be water, air, gas, electricity, or steam. In the case of electricity, the characteristic can be current or voltage, for example. An energy value can be calculated from a measured current and voltage. An intelligent electronic device measures and stores various characteristics of a utility being monitored (e.g., voltage, current, waveform distortion, power, etc.), and the data from each intelligent electronic device can be collected by local data collection points within the system and uploaded to one or more computing machines, such as servers, for storage or analysis.

Figure 1:
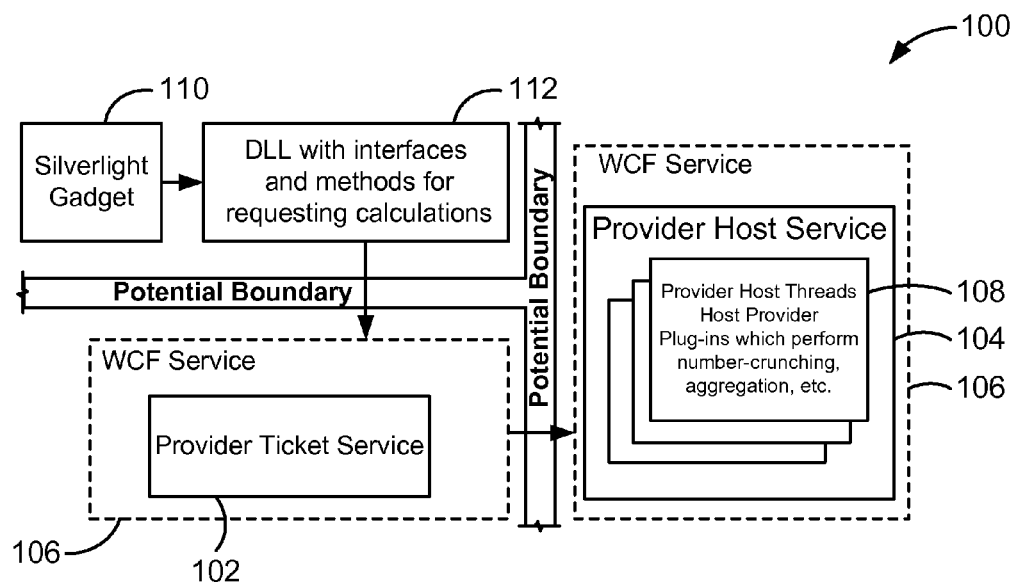
FIG. 1 is a functional block diagram of a Provider Service that includes a Provider Ticket Service and Provider Host Service according to an aspect of the present disclosure.

FIG. 1 is a functional block diagram of a high-level overview of the Provider Service 100, which includes a Provider Ticket Service 102 and a Provider Host Service 104, both of which are wrapped by a Windows Communication Foundation (WCF) service 106. Functions of the Provider Service 100 include any combination of the following (in no particular order):

(a) Accept requests from one or more clients, such as a Silverlight gadget 110, to perform work, such as calculations;

(b) Consolidate requests so that redundant work is eliminated;

(c) Manage and report (when requested) status of ongoing work;

(d) Acquire data and metadata needed to perform calculations;

(e) Perform the calculations requested by the client(s); and (f) Deliver the calculation results to the requesting client when requested.

Figure 2:
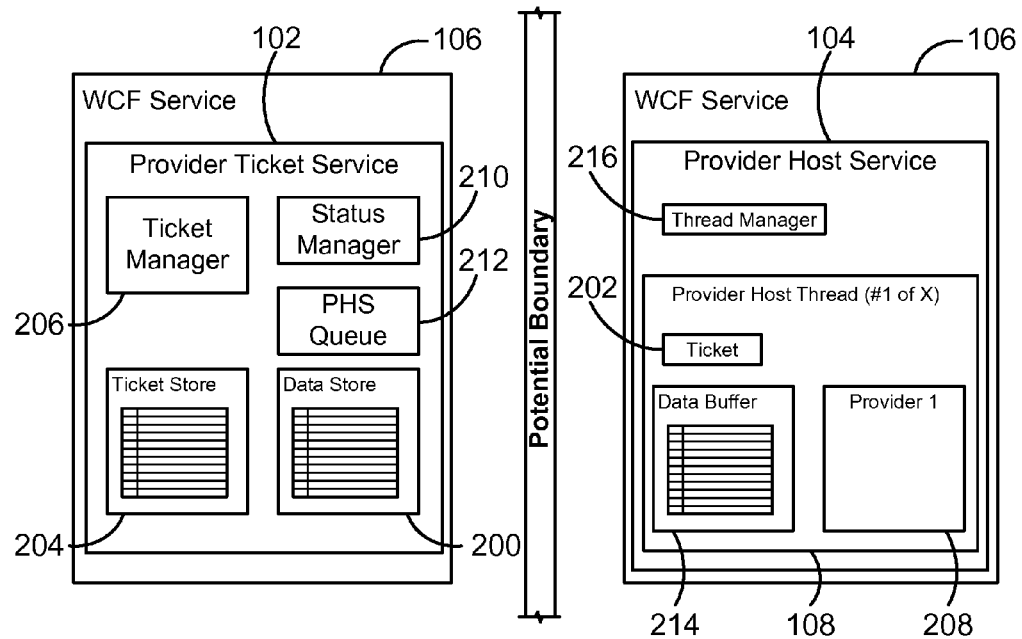
FIG. 2 is a functional block diagram of various components within the Provider Ticket Service and the Provider Host Service.

The Provider Services can use pluggable dynamic-link libraries (DLLs) called Providers, such as the Provider 208 shown in FIG. 2, herein to extend the types of calculations and data that it may work with. The Provider Service 100 functions as part of an SOA architecture in this example. The Provider Service 100 can use a "polling" model, where users of its service periodically call in for status and results. This model provides the most flexible environment, as it accommodates all potential callers from clients, including those residing behind a firewall.

The logical design of the Provider Service 100 includes at least three parts (see FIGS. 1 and 2):

1. A Provider Ticket Service 102;
2. One or more Provider Host Services 104; and
3. Plug-in Providers 208;

The Provider Ticket Service 102 (PTS) represents the "public face" of the Provider Service 100. One or more external clients, such as the gadget 110, communicate with the Provider Ticket Service 102. Functions of the Provider Ticket Service 102 include: accepting requests to perform or carry out work such as calculations, consolidating requests so that redundant work is eliminated, managing and reporting a status of ongoing work, and delivering calculation results when requested.

The Provider Host Service 104 (PHS) is responsible for seeing that the true work of the Provider Service 100—running calculations on input data—is completed and delivered to the results cache or Data Store 200 (shown in FIG. 2). Scalability can be achieved by running multiple Provider Host Service's (on one physical machine or multiple physical machines), which deliver their results to the Data Store 200.

Providers are plug-in dynamic link libraries (DLLs) instantiated (or invoked) and managed by a Provider Host Service 106. A Provider gathers input data needed to perform one or more calculations, performs one or more calculations, and returns results from the calculation(s). A Provider, such as the Provider 208, includes logic to (a) gather the input data needed to perform the calculation, (b) perform a given calculation, and (c) provide status information (when requested) regarding the progress of an ongoing calculation. This status information can include a percentage complete, success or failure, and a reason for failure, a retry count, etc.

The correspondence between a Provider Ticket Service 102 and a Provider Host Service 104 can be one-to-one or one-to-many. For example, one Provider Ticket Service 102 and one Provider Host Service 104 can be executed on one computing machine, such as a computer. Alternately, one Provider Ticket Service 102 can communicate with more than one Provider Host Services 104. These Provider Host Services's can be hosted and executed on one or more than one computing machines, but each returns its respective results from a calculation to one Provider Ticket Service. Put differently, one way of referring to the Provider Ticket Service 102 relative to the Provider Host Service(s) is that the PTS 102 is a master/controller and the PHS 104 is its "worker."

Non-limiting responsibilities of the Provider Ticket Service 104 includes handling any combination of the following (in no particular order):

1. Receiving a work request "Payload" (such as in the form of an XML fragment or JSON string) via a WCF call from a client, such as the gadget 110, requesting a calculation to be performed, embedding this Payload into a "Ticket" 202 (a properly-formed XML document) and returning a unique Ticket identifier (a GUID string) to the client as a token. As used herein, WCF refers to Windows Communication Foundation, which is an application programming interface in the .NET Framework for building connected, service-oriented applications. XML refers to the extensible markup language. JSON refers to JavaScript Object Notation. GUID refers to a globally unique identifier as that term is understood by software developers.

2. Storing the XML-formatted Ticket in a Ticket Store 204 and creating objects to track the progress of the Ticket as it is being worked on (e.g., as the calculation specified in the Ticket is being carried out).

3. Receiving and processing Ticket cancellation requests and notifying any worker processes (i.e. Provider Host Services) regarding Ticket cancellations in a Ticket Manager 206.

4. Reporting Ticket progress/status to clients when requested in a Status Manager 210.

5. Returning final Ticket result data (i.e., the result of the requested calculation) to clients when requested.

6. Allowing external entities to read data that has been previously stored.

7. Handing queued Tickets to Provider Host Services in a PHS Queue 212.

In an exemplary implementation, the Provider Ticket Service 102 is "wrapped" by a Windows Communication Foundation (WCF) service 106 that will registers itself as a Messaging Service client. The WCF service 106 allows Silverlight-enabled components, such as the Silverlight gadget 110, to communicate with either Silverlight-enabled or non-Silverlight-enabled WCF services, so the greatest flexibility is gained by using a standard WCF service and the Provider Ticket Service 102 need not be Silverlight-enabled. The WCF API (Application Program Interface) allows client access to all public functionality of the Provider Ticket Service 102. The Messaging Service will be used by the Provider Service 100 for accessing other Application Module blocks such as authentication and configuration. As used herein, Silverlight refers to the MICROSOFT® SILVERLIGHT™ web application framework available from Microsoft Corporation. Silverlight is a web application framework that integrates multimedia, computer graphics, animation, and interactivity into a single runtime environment.

The Provider Host Service 104 manages and executes the pluggable Providers, such as the Provider 208. The Provider Host Service 104 can host multiple provider host threads 108, each thread 108 executing one or more Providers 208. The maximum number of threads 108 that a Provider Host Service 104 allows to run is configurable. A Provider Host Service 104 can also be configured to handle only certain types of calculations and Providers.

Providers 208 can also be chained. For example, a single thread can run multiple Providers in a determined sequence, with each output of one Provider acting as an input to the next Provider in the sequence, and the last Provider in the chain produces the final result. Providers can be configured to accept such chaining, and only pre-configured combinations of Providers can be permitted. These combinations can be determined by information obtained from a configuration file residing with the Provider Ticket Service 102.

Responsibilities of the Provider Host Service 104 include any combination of the following (in no particular order):
  Notifying the Provider Ticket Service 102 that it has X number (where X is an integer value) of threads available for executing Tickets;
  Receiving Tickets from the Provider Ticket Service 102 (the PTS 102 calls into the Provider Host Service 104 to hand the PHS 104 a Ticket) and placing them in a queue 212 that is local to the PTS 102;
  Launching or invoking provider host threads 108 that host Providers 208 and passing a Ticket to each invoked thread 108;
  Monitoring and managing the threads 108 over their lifetime;
  Terminating threads 108 that have exceeded their allocated run time; and
  Passing progress reports from the Provider 208 back to the Provider Ticket Service 102. When the Providers 208 are chained, the PHS 104 adjusts a percentage complete reports based on how many Providers 208 are chained. For example, if a first Provider of four chained Providers reports 100% completion, the overall progress is only 25% complete.

Responsibilities of each provider host thread 108 include any combination of the following (in no particular order):
  Instantiates one or more Providers 208;
  Relays result data from a calculation carried out by the Provider 208 to the Data Store 200; and
  Reports Provider 208 progress and status to the Provider Ticket Service 102.

In an example configuration, Providers 208 can reside in plug-in dynamic link libraries (DLLs), which are consumed by Provider Host Services 104. One dynamic link library can include multiple Providers, allowing third-parties to extend the functionality of the Provider Service 100 by creating new Providers that perform new calculations, produce new types of aggregated data, work with new types of hierarchies, and so on. The Provider developer can code their Provider (using a supplied Software Development Kit or SDK) to handle any combination of the following tasks (in no particular order):
  Examine a Ticket and determine what input data needs to be obtained to perform its calculations, such as Common Data Model (in the SOA context) topics;
  Request necessary input data from the Data Store 200 and/or from a Data Service Bus 600 (FIG. 6) or DSB, where applicable;
  Perform calculations on the input data; and
  Store results, and any applicable intermediate data, in the Data Store 200.

The architecture disclosed herein supports the creation of a Provider, such as the Provider 208, that allows scripted calculations, removing the need to create Provider plug-ins, as virtually any calculation can be implemented by creating a new script. However, creating customized Providers for specific calculations can provide an opportunity for optimizations not possible with a scriptable Provider.

The operation of the Provider Service 100 will now be described by detailing an exemplary progress of a client work request, from the moment the request is made, to the delivery of the result data. A client or gadget project 110 should first be configured to invoke methods or Providers on the Provider Service 100. Assuming that the Provider Service 100 is installed and configured properly on a computing machine such as a server, a gadget or other client is configured to call the Provider Service 100 in the following non-limiting example:

1. In the project for the gadget or client 110, a reference is added to a dynamic link library called (in this example) ProviderMethods.dll 112. This DLL 112 includes interfaces that publish the high-level methods Gadgets 110 will call to request calculations.

2. A "using" statement is added to the gadget/client code, such as "using Company.Modules.Calculation.Provider."

3. Locate the name of a desired calculation to be performed or carried out.

4. Add a call in the gadget/client code to the located calculation, such as, for example, "Provider.GetEnergyRolledUp," which is a call to a Provider named GetEnergyRolledUp, which returns a rolled-up energy calculation on input data indicative of values needed to calculate energy consumption over a desired time period.

5. For gadget developers using MICROSOFT® VISUAL STUDIO®, the Intellisense function will reveal the appropriate method arguments to provide to the calculation Provider.

In this example, the methods in the ProviderMethods.dll file 112 are high-level, easy-to-invoke calls that are present for the convenience of gadget developers. In an alternate implementation, some or all of the providers do not have high-level calls in a ProviderMethods.dll file 112. In such a case, that developer can publish a separate DLL 112 that includes high-level methods to invoke the desired calculation(s). This separate DLL 112 would need to be referenced in the gadget project 110. Another example involves the gadget/client developer looking up the actual calculation identifier and XML format for the data that needs to be passed to a particular Provider and make a direct WCF call to the Provider Service. This bypasses the high-level method calls in DLLs such as ProviderMethods.dll 112 but, ultimately produces the same result.

Figure 6:
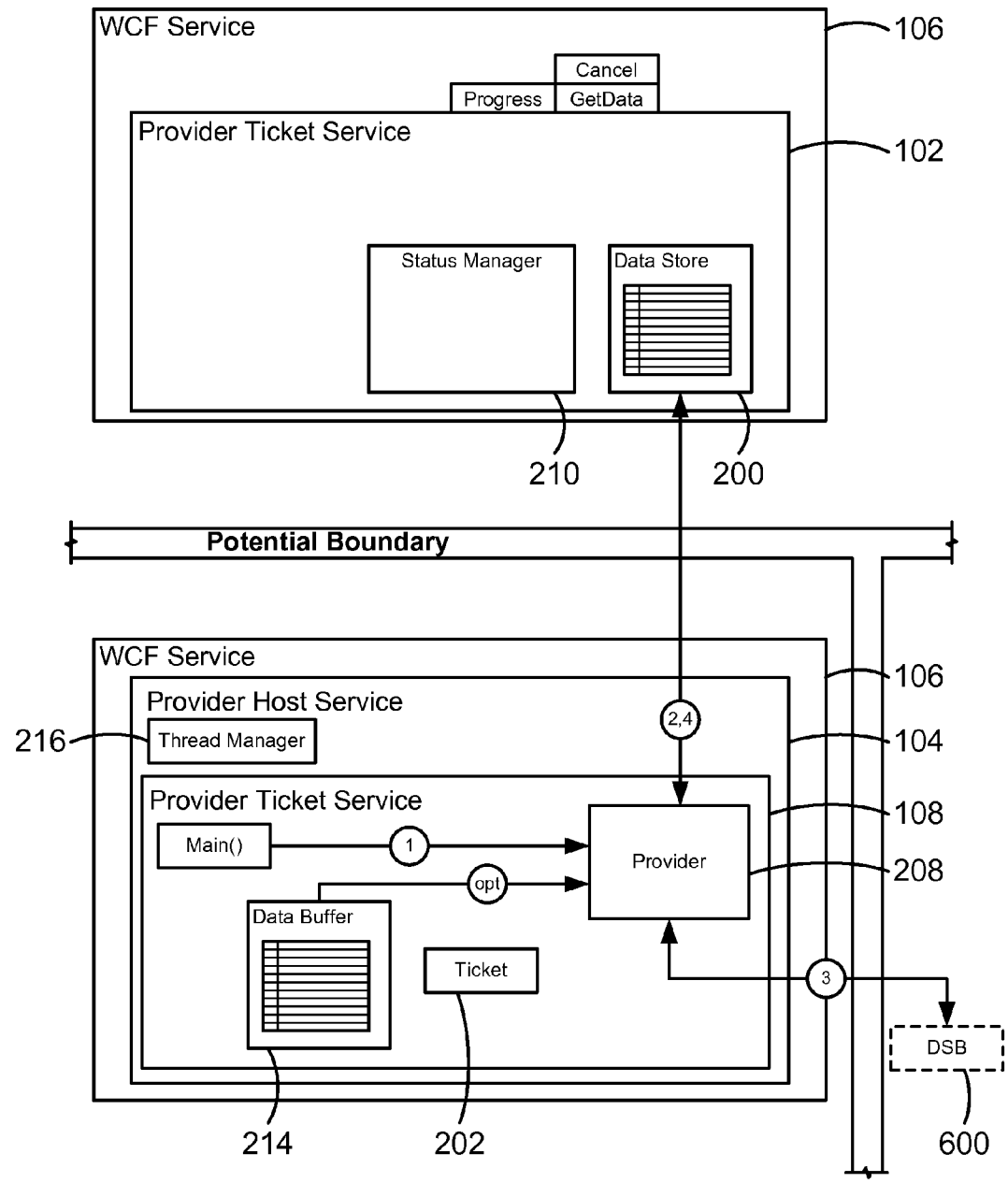
FIG. 6 is a functional block diagram showing the Provider Host Service working on the ticket and passing the result to a data store of the Provider Ticket Service.

This section describes an example of a path that a request makes from the Client 110 submitting the work request (FIG. 3) to the Client 110 retrieving the results (FIG. 6). An example listing of the path is as follows:

1. The Client 110 submits a Ticket Payload to the Provider Ticket Service 102 (PTS) (FIG. 3) and receives an unique token from the PTS 102. The handler 206 checks with the Status Manager 210 whether a checksum (ticket identifier) exists for the received ticket. The handler 206 can also generate a ticket if necessary and add a new checksum or update an existing checksum (ticket identifier) and optionally the status, and passes this information to the Status Manager 210. The handler 206 can also enqueue a new ticket or update a URI endpoint.

Figure 3:
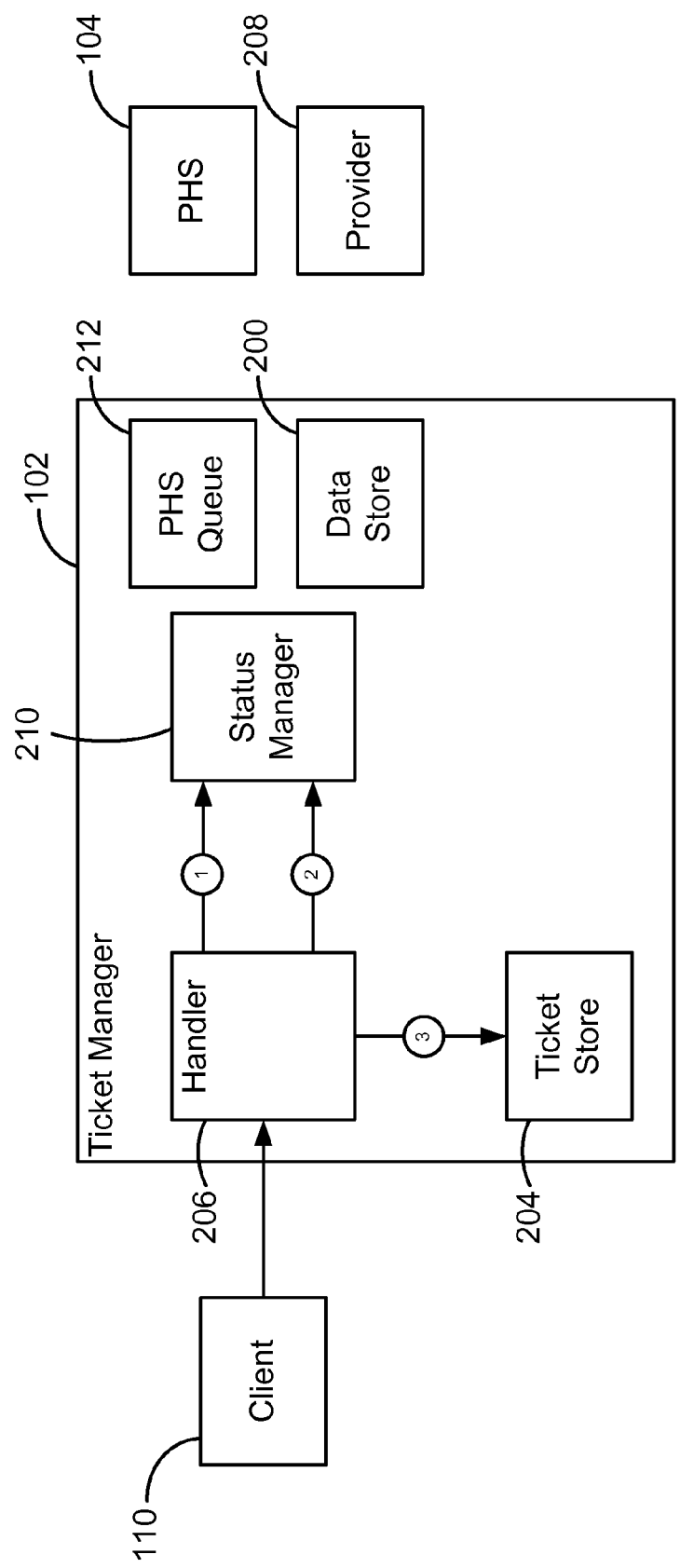
FIG. 3 is a functional block diagram showing a Provider Ticket Service receiving a payload from a client.

2. The PTS 102 embeds the received Payload in a Ticket 202, which is placed in a Ticket Store 204 accessible by the PTS 102 (FIG. 3).

Figure 4:
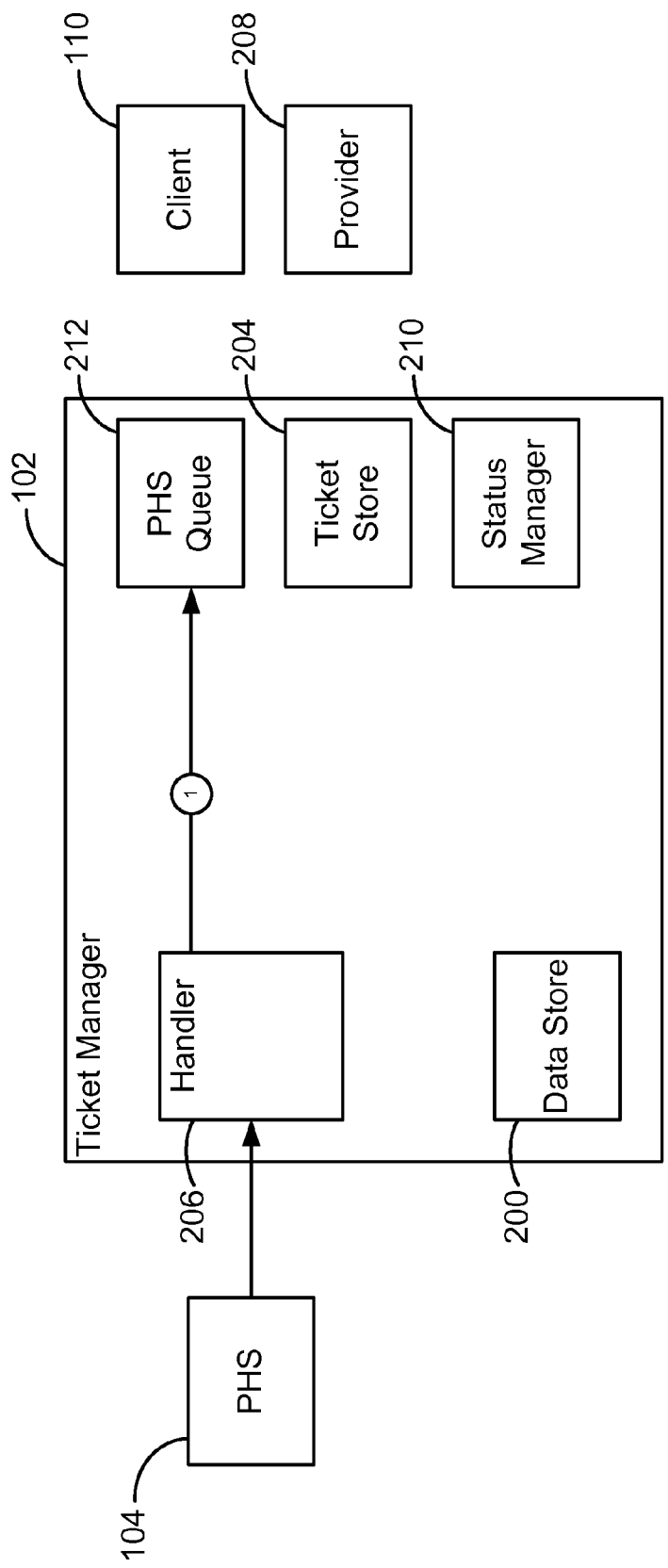
FIG. 4 is a functional block diagram showing a Provider Host Service requesting tickets from the Provider Ticket Service.

3. A Provider Host Service (PHS) 104 notifies the PTS 102 that it is ready to accept one or more Tickets 202 (FIG. 4). The handler 206 inserts a URI endpoint for the PHS 104 into the PHS Queue 212.

Figure 5:
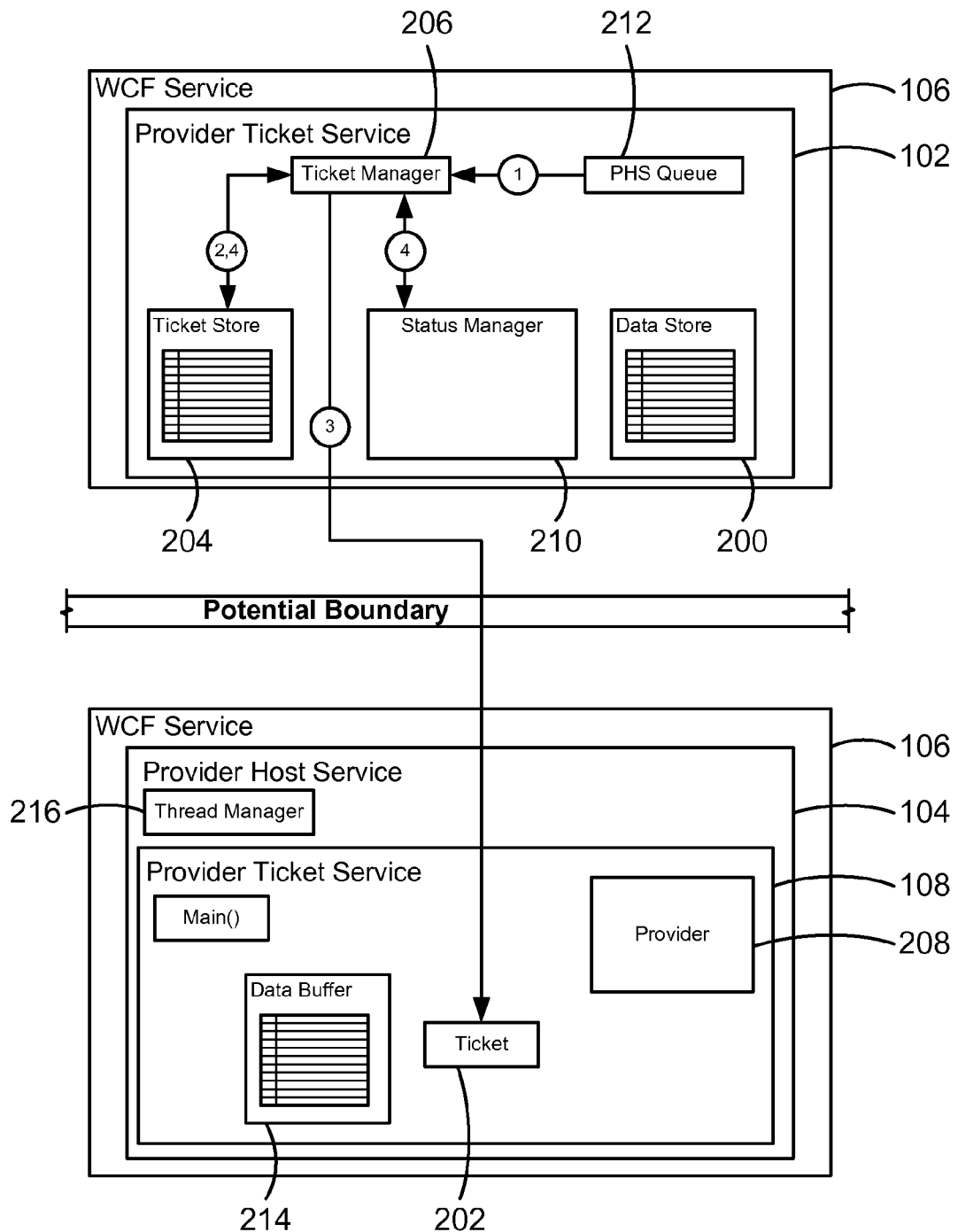
FIG. 5 is a functional block diagram showing the Provider Ticket Service passing a ticket to the Provider Host Service.

4. The PTS 102 submits the Ticket to a PHS 104 (FIG. 5). The Ticket Manager 206 obtains a queued URI for the PHS 104 from the PHS Queue 212, retrieves a queued ticket from the Ticket Store 204, submits the ticket to the PHS 202, dequeues the ticket from the Ticket Store 204 and updates the status of the ticket in the Status Manager 210.

5. The Thread Manager 216 of the PHS 104 launches a thread 108 in which to run the appropriate Provider 208 (FIG. 5).

6. The calculation associated with the Ticket 202 is worked on by the Provider 208 to perform the requested calculation.

7. The Provider 208 writes the result or results from the calculation to the Data Store 200 (FIG. 6).

8. Client 110 checks on progress (FIG. 7) by passing its token received from the PTS 102 corresponding to the ticket. The Ticket Manager 206 passes the checksum (ticket identifier) corresponding to the ticket to the Status Manager 210, which returns the status of the ticket (e.g., pending, in-progress, waiting, completed), and the Ticket Manager 206 reports the returned status back to the client 110.

Figure 9:
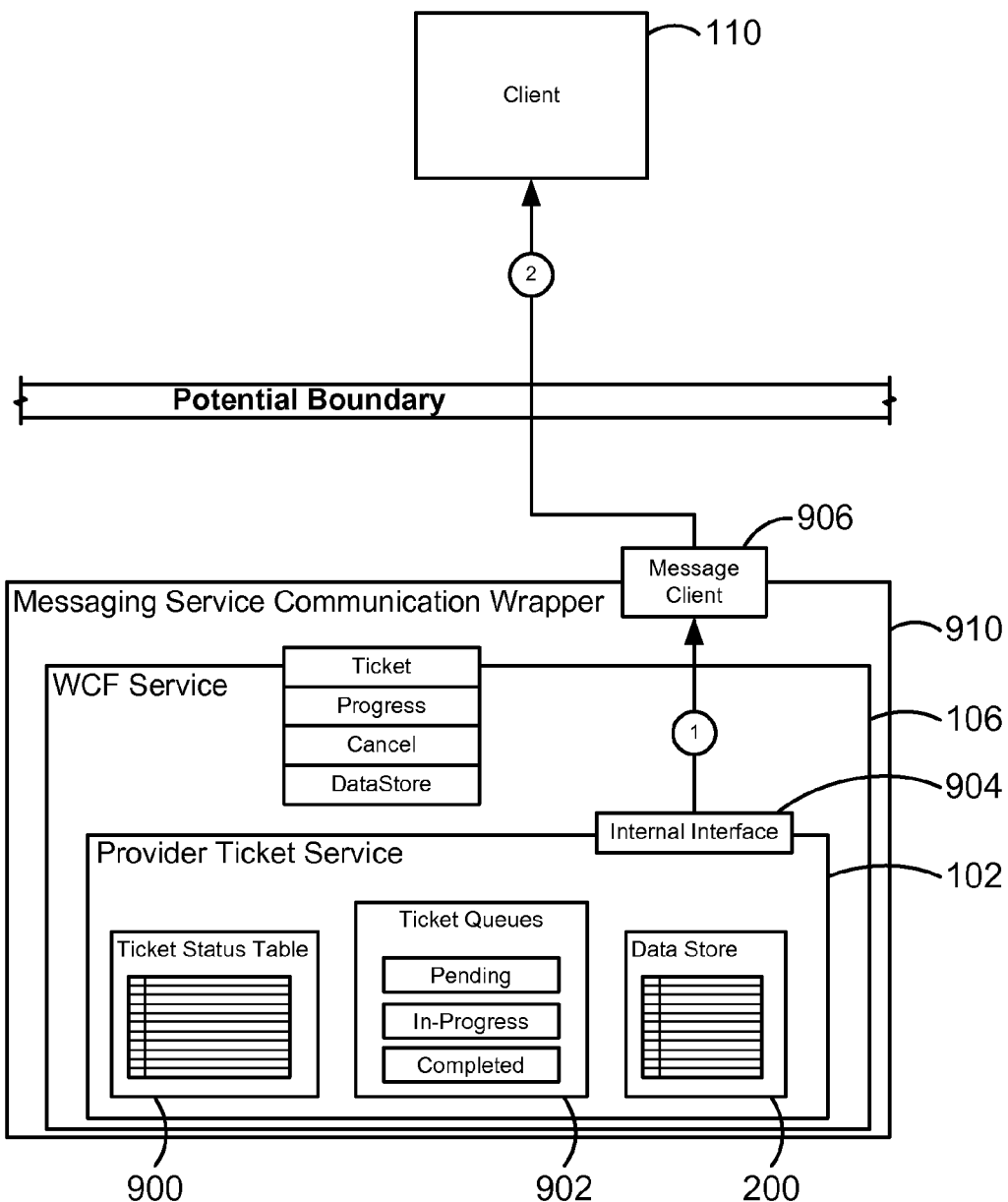
FIG. 9 is a functional block diagram showing the Provider Ticket Service notifying the client that the ticket has been completed using a callback function.

9. Client retrieves the results, such as from the Data Store 200. In FIG. 9, a block diagram of notifying the client 110 of a ticket's completion by a callback function is shown. When a ticket has been completed as indicated by a Ticket Queue 902 and the result returned to the Provider Ticket Service 102, the PTS 102 sends the result via an internal interface 904 internal to the WCF Service 106 to a message client 906 in a Message Service Communication Wrapper 910, which uses a callback function to pass the result back to the client 110.

A more detailed description of each of the foregoing blocks follows, using the same numbered paragraphs.

1. The Client 110 submits a Ticket Payload and the Provider Ticket Service 102 receives the Payload (see FIG. 3). In this example, a "Ticket Payload" describes a calculation that needs to be performed and can be, for example, an XML fragment or JSON string. A payload can take almost any form as long as the Provider plug-in it is intended for knows how to interpret its information. In this example, a "Ticket" is a well-formed XML document that wraps one or more Ticket Payloads, and provides additional "housekeeping" information about the request, such as the date and time of the request.

Clients 110 are not responsible for submitting Ticket Payloads or Tickets, although they can submit Ticket Payloads directly through WCF calls if desired. Instead, Clients make high-level calls on the interface methods in ProviderMethods.dll 112, and these methods 112 generate Ticket Payloads from the provided parameters. An example payload can look like this:

```
<payload id="DA0F2C00-0B3A-4768-9B76-9F94497F05D1">
    <sourceId>
            <int>34</int>
<int>898</int>
    </sourceId>
    <topicId>
            <int>1004</int>
            <int>1034</int>
    </topicId>
    <startDate>2001-02-10 00:00:00.000</startDate>
    <endDate>2007-01-10 00:00:00.000</endDate>
<metdataItem>Building</metadataItem>
        </payload>
```

In the above payload example, the client 110 provides information about the devices (i.e., sources of data needed for the requested calculation), topics (e.g., topical information such as current, voltage, energy, power, and the like, about the data from the identified sources), and date or date ranges over which a calculation is requested to be performed. It should be noted that this is not enough information to perform the requested calculation. In this example, the desired calculation is not even indicated in the above XML fragment. Instead, the high-level method implementations can pass additional parameters to the Provider Ticket Service 102 along with the payload. Specifically, the methods 112 can provide a GUID that identifies the specific calculation desired, a URI that can be called back with result status (for future use), and an integer indicating the priority of the request (also for future use). As used herein, a URI refers to a Uniform Resource Locator in the context of the Internet. GUID refers to a globally unique identifier as understood in the context of software applications. Examples of topical information encoded in the topical identifier (topicId) are provided below in Table 1.

Each payload can have an "id" attribute, which is a GUID that uniquely identifies the structure of this particular payload. Any changes to the payload structure should result in that payload's being assigned a new GUID. A Provider 208 can be written to expect specific combinations of payload identifications, and by recognizing older combinations of payload identifications, the Provider 208 can support backward compatibility with older Payload identifications.

In addition to the source and topic identification information, the ticket can further include a dependency identification associated with the source identification and the topic identification. The dependency identification has a unique value relative to dependency identifications associated with every other one of the tickets to permit multiple instances of the same source-topic combinations having the same source identification and the same topic identification. For example, the dependency identification can identify one of several time-of-use (TOU) schedules, each of the TOU schedules being associated with the same source identification and the same topic identification. Alternately, the dependency identification can be associated with a different cost schedule. For example, a TOU schedule can have three different periods of energy consumption: on-peak, shoulder-peak, and off-peak. Depending on the source of the energy data, the TOU schedule can be different. For example, the on-peak period may occur between 8 am-10 am for one source of data, but at a different time of year, the on-peak period may occur between 9 am-12 pm for the same source of data. Without the dependency identification, the PHS 104 would have no way of differentiating the data for purposes of calculating an energy consumption according to a particular TOU schedule. Moreover, different cost schedules apply during different periods of usage. For example, the cost schedule during on-peak periods is typically higher than during off-peak periods. The dependency identification allows the same source-topic data to be used to calculate energy usage according to different cost schedules or according to different TOU schedules. In essence, the dependency identification is a third identifier that allows multiple instances of the same source-topic identifiers to be stored and indexed for use in different calculations.

The ProviderMethods.dll wrapper method passes the payload information to a standard method on the Provider Ticket Service 102 called, in this example, SubmitRequest. An example of a method signature for SubmitRequest is: string SubmitRequest(int calculationId, string payload, URI endpoint, int priority).

To prevent the need to add associated methods to the ProviderMethods.dll 112, and thus recompile and distribute the DLL, Provider developers can distribute a dynamic link library (or even the Provider DLL itself), which exports an interface that includes its high-level methods.

2. The Provider Ticket Service 102 embeds the payload in a Ticket, and the Ticket together with the embedded payload is placed in the Ticket Store 204 as shown in FIG. 3. Once the PTS 102 receives this payload and other information, it "wraps" it in a Ticket 202 that can look like this, for example:

load portion of the Ticket 202. This ticket identifier is the identifier used to uniquely identify this particular work request in the Provider Service 100. Note that another SubmitRequest call that passes in the same Payload will result in the generation of the same ticketId value. In this way, duplicate/redundant work requests can be identified. In fact, when the Provider Ticket Service 102 first generates the Ticket 202 for newly-passed in Payload, it checks with the Status Manager 210 component of the Provider Ticket Service 102 (a component that tracks the ongoing status of each work item) to see if an identical work request (i.e. a request with the same ticketId) is already in a Ticket Store 204 component of the Provider Ticket Service 102. If so, instead of creating new structures to track a new work request, the existing structures are updated in the Status Manager 210 to reflect the fact that a new request has been made against it, and the previously-stored Ticket (in the Ticket Store 204) is updated with the URI endpoint of the new requester. If an identical request is not present in the system, new structures in the Status Manager 210 are created to track the work, and the new Ticket is stored in the Ticket Store 204 component of the PTS 102.

The calculationId field is a calculation identifier corresponding to a GUID used to uniquely identify the calculation being requested. In an example implementation, the calculation identifier corresponds directly to a single Provider 208. In other implementations involving chaining of multiple Providers together, a calculation identifier can correspond to an ordered list of Providers. An XML-based configuration file which resides on the machine that hosts the PTS 102 provides these mappings that indicates a sequence order that each of the Providers in the list are to be invoked.

```
<?xml version="1.0" encoding="utf-8"?>
<Ticket xmlns:xsi="http://www.w3.org/2001/XMLSchema-instance"
        xmlns:xsd="http://www.w3.org/2001/XMLSchema">
    <ticketId>d0be2dc421be4fcd0172e5afceea3970e2f3d940</ticketId>
    <calculationId>0FEC9A92-5377-48C7-9E8F-1F4CA8E84ADD</calculationId>
    <priority>1</priority>
    <creationDateTimeUtc>2010-06-10 00:09:12.453</creationDateTimeUtc>
    <rawDataAvailable>false</rawDataAvailable>
    <endpoints>
        <Uri>http://myendpoint.net</Uri>
    </endpoints>
    <providerOrderedListOfIds>
        <provider assembly="BaseProvders.dll">
            65D95599-A59F-49D2-8069-EC5EEEDB72EC
        </provider>
    </providerOrderedListOfIds>
    <payload id="DA0F2C00-0B3A-4768-9B76-9F94497F05D1">
        <sourceId>
            <int>34</int>
            <int>898</int>
        </sourceId>
        <topicId>
            <int>1004</int>
            <int>1034</int>
            <int>1009</int>
        </topicId>
        <startDate>2001-02-10 00:00:00.000</startDate>
        <endDate>2007-01-10 00:00:00.000</endDate>
        <metadataItem>Building</metadataItem>
    </payload>
</Ticket>
```

Additional, standardized information has been added to the above example Ticket 202. Specifically, any combination of the following fields can appear in the Ticket 202:

The ticketId field is a ticket identifier that includes an MD5 (Message-Digest algorithm 5) checksum run over the Pay- A priority field optionally allows callers (e.g., Clients, such as the client 110) to indicate that their calculation request has higher/lower priority than other calls.

The creationDateTimeUtc field refers to the date and time in UTC (Coordinated Universal Time) format at which the Ticket (not the payload) was created. This information can be used to expire requests (i.e. indicate that they have timed out).

The rawDataAvailable field indicates whether or not raw data (needed to perform the requested calculation) was provided with the request. Some clients may desire to provide data obtained from an external source, rather than rely on other parts of Application Modules (such as the Data Source Drivers) to supply data. In this case, a WCF method is invoked that allows the user to pass in their own data with the ticket, and this flag will be set in the Ticket. Normally, the ticket includes a source identification that identifies the source of the raw data to be used to perform the requested calculation, and the Provider that is tasked with the calculation retrieves the raw data from the identified source(s).

The endpoints field refers to the endpoints or URIs of all the Ticket's requesters, allowing the ticket to track these requesters. If a payload arrives at the Provider Ticket Service 102 (PTS), and a payload with the same ticketId is already in progress, the caller's URI is added to this list. For a new ticketId, a new Ticket is created, and the endpoints section includes a single URI.

The providerOrderedListOfIds field specifies an ordered list of Providers, along with their identifiers and the names of the dynamic link libraries that contain them. The order indicates (in the case of chained Providers) the order or sequence in which the Providers are to be run to perform the desired calculation. Note that because one DLL might contain multiple Providers, a DLL name can be referenced by more than one Provider identifier. The mapping from the calculationId field to this information can be obtained from an XML-based configuration file located on the computing machine hosting the Provider Ticket Service 102. Because this mapping has been resolved on the PTS 102, no mapping or lookup needs to occur in the Provider Host Service (PHS) 104. The PHS 104 simply needs to have access to Provider DLLs so that the PHS can load and run the DLLs.

3. A Provider Host Service 104 (PHS) notifies the Provider Ticket Service 102 (PTS) that it is ready to accept Tickets, such as by requesting one or more Tickets as shown in FIG. 4. In this example, a "lazy push" model is used for sending Tickets from the PTS 102 to the PHS 104, and works as follows. The Thread Manager 216 is a method on the PHS class that runs in its own thread 108. This is the main thread 108 of the PHS 104. The Thread Manager 216 is responsible for causing the PTS 102 to be notified that it is ready for X (where X is an integer value) number of work requests.

The Provider Host Service (PHS) class includes a method that returns the number of provider host threads 108 that it has available to perform work by examining the data structure that holds the thread identifiers mapped to the calculation identifiers, for example. The PHS class can perform simple or complex logic to determine how many more threads it can take on.

A PHS 104 calls a method on the PTS 102, called in this example, RequestTicket, and the PTS 102 places the PHS's URI in a list or queue 212. The URI for a PHS can exist more than once in this queue 212, as the PHS 104 may be willing to work on more than one calculation at a time on different threads. The PTS 102 maintains a list of which calculations a PHS 104 is capable of handling. If there is no entry in this list for a PHS 104 that has made a Ticket request, the PTS 102 calls a method on the PHS 104 asking for this list. As work becomes available, the PTS 102 attempts to send Tickets to the PHS URI's that are on its queue. The various PHS's (if there are more than one) may accept or refuse the Tickets 202, and may return a status result indicating the reason for their refusal. The PTS 102 can make decisions about whether to send the Ticket 202 to another PHS on the queue 212, to fail the Ticket, etc. A PHS 104 might refuse a Ticket because it is too busy (i.e. all allowable threads are active), or for some other reason.

4. The PTS 102 submits a Ticket 202 to the PHS 104, such as shown in FIG. 5. A WCF thread runs the SubmitTicket method on the Provider Host Service class. The SubmitTicket method parses the Ticket 202 to determine the names of the Provider DLLs, and whether or not these DLLs are present and can be properly loaded. Tickets should be sent to the Provider Host Services that support the requested calculations, but the PHS 104 can optionally verify that the necessary Providers are present on the computing machine hosting the PHS 104 as an integrity check. In this example, the PHS 104 has an in-memory list of DLLs that are present, and the PHS 104 can look up the creator of the DLL using the DLL name as a key. The SubmitTicket method uses this information to determine whether to return success or failure to the requesting PTS 102. The return value is not a simple Boolean value, rather is a more descriptive return value that indicates whether the PHS 104 is too busy, or there is some error condition.

Logic for SubmitTicket can proceed as follows. If the PHS 104 is too busy, return Busy. If the PHS 104 is not too busy, for each Provider, ask if the DLL supports the Provider and the Provider's payload identifications. If so, return Accepted, otherwise return an indication of whether the provider identification or the payload identification was rejected.

The SubmitTicket method creates, but does not launch, a Provider Host Thread (PHT) 108 (the Thread Manager 216 will do that later), and stores a reference to the launched thread in a data structure 214. This data structure 214 stores the thread identifier, calculation identifier, checksum, and a thread expiration or "Time to Live" (TTL) and the class instance of the PHT 108. It will also return code for when the PHT 108 finishes. The Thread Manager 216 uses the TTL to determine whether the calculation has taken too long.

5. The Provider Host Service (PHS) 104 launches a thread in which to run the appropriate Provider 208. The PHS 104 receives a Ticket 202 when a WCF thread runs the ISubmitTicket::Submit method of the PHS class. Inside this method, a new Provider Host Thread (PHT) 108 is instantiated or invoked, but not run, for the request. The Ticket 202, thread instance, and other information about the request will be placed in a structure in the PHS class for later reference.

The PHS 104 includes a Thread Manager 216, which is a method of the PHS class running on a thread and monitors the threads 108 and terminates them if they exceed a timeout limit. The Thread Manager 216 prevents a locked thread from tying up resources and never exiting. The Thread Manager 216 also launches any PHTs instantiated in the previous step.

The provider host thread (PHT) 108 has members and makes certain allocations at startup, as described next. The PHT 108 receives from the Thread Manager 216 an interface with which to access the Data Store 200 (i.e. IDataAccess). It also obtains the provider count if chained, and stores it in a member property. The PHT 108 also has a member that is a reference to an instantiated Provider 208, which points to the current Provider 208 instantiated, even in the chaining example. The PHT 108 has a member that holds the Ticket 202, as well as a member that is an event or other signal-able object, which is used by the Thread Manager 216 to signal the PHT 108 that it has run out of time. If the Thread Manager 216 gets no response from the PHT 108, it calls TerminateThread, which terminates the thread. After signaling the PHT 108 that it has run out of time and to terminate, the Thread Manager 216 places a block on the PHT 108 thread identifier, and waits a reasonable amount of time for it to terminate. If it does not terminate after the waiting period, the Thread Manager 216 calls TerminateThread to terminate the thread.

While the PHT 108 is within its time to live and has not reported completion, the Thread Manager 216 does nothing about the thread. If the exit status has changed to some sort of completion, the Thread Manager 216 reports completed or failed and proceeds to Block(0) on the thread identification until the thread ends. If the thread 108 does not end in a reasonable time period, it needs TerminateThread anyway. If the thread successfully terminate itself, the thread manager can request more tickets.

If the thread 108 exceeds its TTL, the Thread Manager 216 first attempts to notify the thread 108; if that fails, the Thread Manager 216 forcefully terminates the thread. Either way the Thread Manager 216 reports a thread failure.

In the PHT 108, the "local data store" is an IDataAccess interface (part of the API) that allows communications with the same database utilized by the Data Store of the Provider Ticket Service 102, shown in FIG. 6.

The PHT 108, after running all Providers, but before signaling completion, writes data to the Data Store 200 (i.e., the data store 200 of the Provider Ticket Service 102) as follows: The PHT 108 owns an array or dictionary that maps a Provider identification to a TransportDataObject or objects. After the PHT 108 runs all Providers, it pulls out the TransportDataObject for the final Provider's Result data and passes it to WriteTicketResults on IDataAccess, thus writing result data to the Data Store 200, which represents the result of the calculation.

The Ticket 202 can include a field that indicates whether or not raw data is retrievable from the DataStore 200. If so, the Provider 208 can read this data from the data store 200 by calling a method on IDataAccess and passing it in the Ticket identifier.

The PHT 108 has three read/write functions: ReadInputData, in which the input data for the calculation to be performed by the Provider 208 is read, WriteIntermediateData, in which the PHT 108 outputs an intermediate result for another chained Provider, WriteResultData, in which the PHT 108 outputs the result of the calculation when the PHT 108 is the last chained Provider or the only Provider needed to carry out the requested calculation. The PHT 108 determines what logic is involved in the case where third party data is provided, and for different Providers in a chain.

6. FIG. 6 illustrates an implementation in which the Ticket 202 is worked on by the Provider 208. The Provider Host Thread 108 invokes the Provider 208 by inspecting the DLL that contains the Provider 208 according to the Provider identification in the Ticket 202. The Provider 208 can obtain data from at least two locations:

The Data Store 200 hosted by the Provider Ticket Service 102. The Provider 208 can search the Data Store 200 for previously calculated results or intermediate data to shorten the time required for the Provider 208 to perform its calculation.

A Data Service Bus 600 (DSB). The Provider 208 can query the DSB 600 for raw data from external data source drivers (DSDs).

A combination of the above can also be utilized. For example, a gadget 110 displaying information from the past hour refreshes every 15 minutes. A Provider 208 can retrieve the results of the first 45 minutes from the Data Store 200 and thus only needs to acquire 15 minutes worth of raw data from the DSB 600.

While running, a Provider 208 calls UpdateTicketStatus on an interface that is implemented in the Provider Host Thread class, and has access to the PHT class member that shows the number of Providers in the chain. This allows the PHT code, which is aware that the percentage complete from a particular Provider is only part of the picture, to calculate the overall percentage complete and pass that completion status to the PTS 102.

The Provider 208 can also check whether the Ticket 202 has been canceled so that the Provider 208 can terminate the calculation early and free up resources for other Tickets. The Provider's coder can perform these updates and checks and to write applicable intermediate date to the Data Store 200 of the PTS 102.

7. FIG. 6 illustrates an implantation in which results are written to the Data Store 200 by the Provider 208. When finished with the requested calculation, each Provider attempts to write its result data to the Data Store 200 using the Provider's IDataAccess interface. The Provider Host Service 104 (PHS) sets the Ticket's status to "completed" in a Ticket Status Table, the Ticket's progress to 100%, and notifies the Provider Ticket Service (PTS) 102 that the Provider 208 has finished the calculation requested by the ticket 202.

Figure 7:
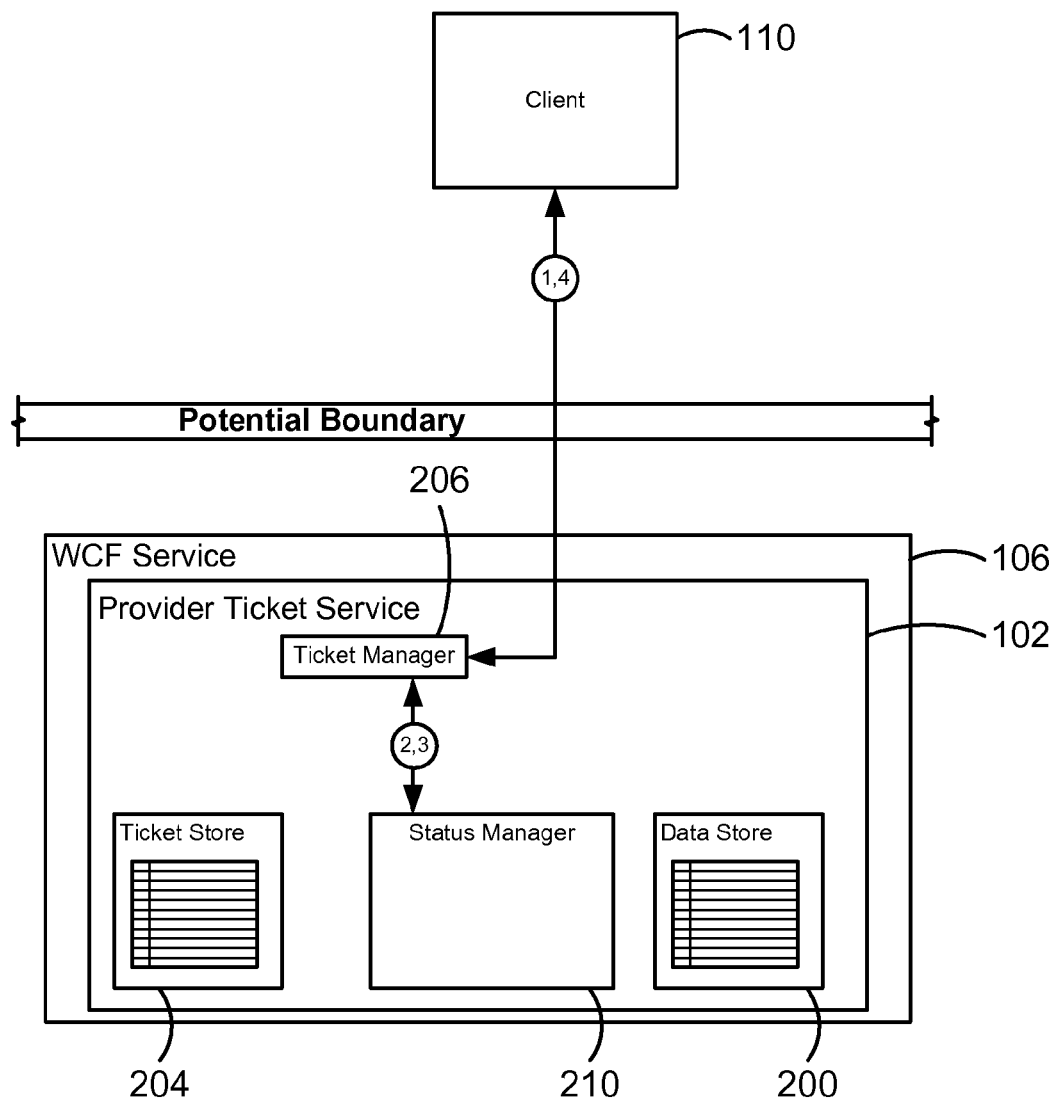
FIG. 7 is a functional block diagram showing a client requesting a status of a ticket being handled by the Provider Ticket Service.

8. FIG. 7 illustrates how the Client 110 can check on a ticket's progress. Clients 110 poll the Provider Service 100 using the token passed back from the PTS 102 to determine whether the Ticket 202 is completed. If the client 110 knows that the Provider 208 updates its progress status, the client 110 can periodically query for this progress. This can be used to display a progress bar by the client 110 or to determine the amount of time to wait until the next query.

9. When the client 110 determines that there are results ready for it, it requests the result data, again using its token. The Provider Service 100 passes this request to the Ticket Manager 206. The Ticket Manager 206 queries the Data Store 200 for the corresponding result and returns it.

At this point the Ticket 202 is considered to have completed its life cycle. It is deleted from the Ticket Store 204 and its status information is erased from the Ticket status table.

The Provider Service's Communication Wrapper 106 can include an interface to allow for callback notification. Additionally, when multiple Providers are chained together to perform a sequence of calculations, the Ticket Manager 206 uses the Ticket to determine which Provider's result(s) to pass back. In addition to submitting Tickets, checking on progress, and retrieving results, a Client 110 can also cancel a Ticket. When the Provider Service 100 receives a cancel request, the Ticket Manger 206 marks the Ticket canceled status as "true." The Ticket Manager 206 should not immediately delete the Ticket for several reasons. First, a Provider might already be working on that Ticket. Second, the Ticket might still be pending, but its ID might be in the middle of a queue or it is in the middle of being handed off to a PHS 104.

If a Provider 208 is working on the Ticket 202, it should periodically check to see if a Ticket is marked for cancel. Upon discovering this, the Provider 208 should immediately, and gracefully, terminate, performing any necessary cleanup. If a Provider does not check for cancellation, then it merely runs to completion. All that is affected is that a thread is tied up working on an expired Ticket. After the Provider has terminated, the PHS 104 sets the Ticket status to "completed" as it normally does.

If the Ticket is still pending, as the Ticket Manager 206 is retrieving Tickets from the Ticket Store 204 in Block 3 above, the Ticket Manager 206 deletes any Tickets that have been flagged as canceled.

The Ticket Manger 206 will occasionally perform a cleanup of any canceled Tickets that are ready to be deleted. In other words, it deletes any Ticket that has an is-canceled flag of "true" and a status of "completed."

Figure 8:
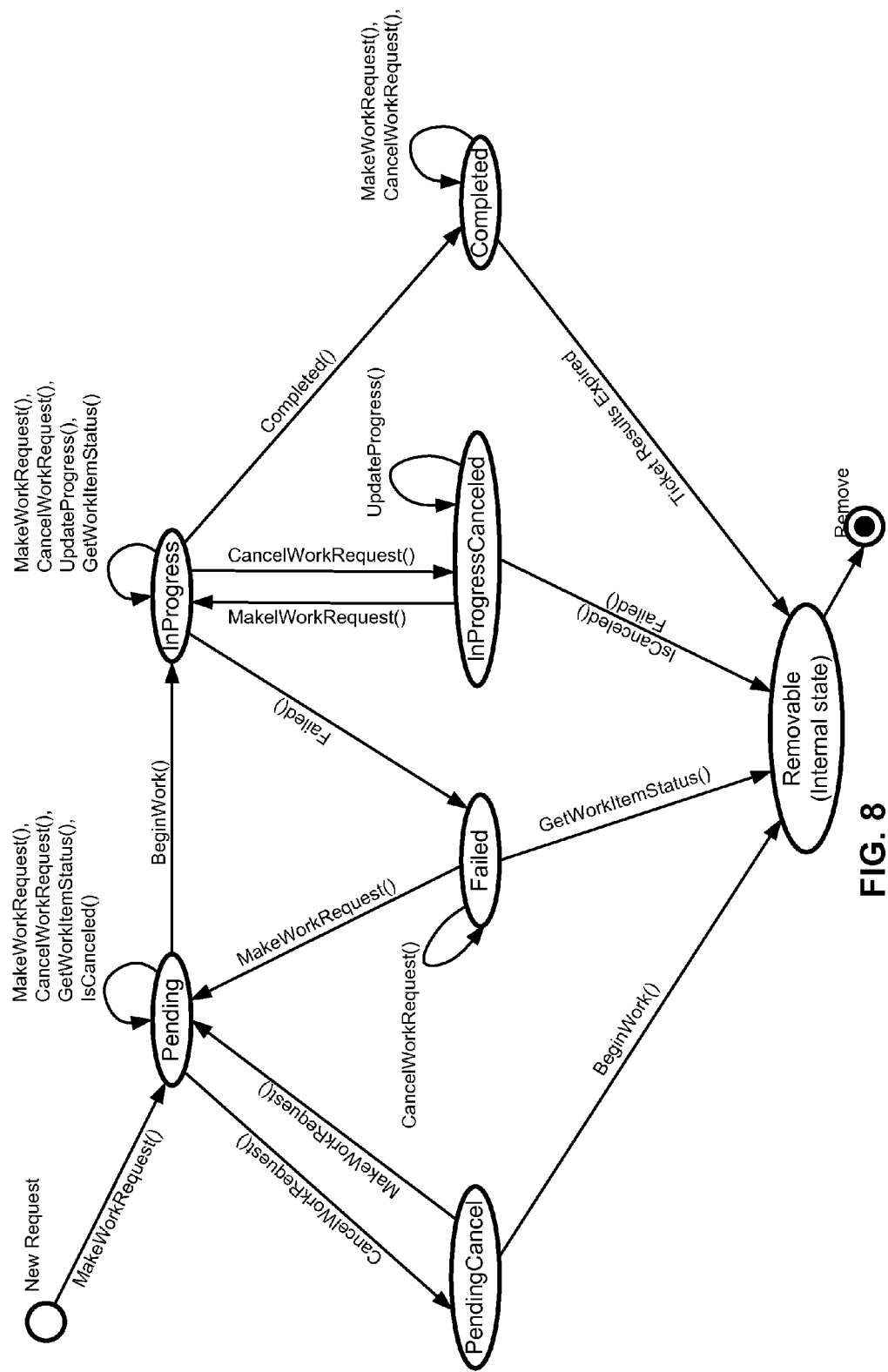
FIG. 8 is a state machine in Unified Modeling Language (UML) format that is used by the Status Manager of the Ticket Manager of the Provider Ticket Service.

The component named Status Manager 210 resides in the Provider Ticket Service 102, and includes a state machine (or other means of managing state logic) and two dictionaries. The first dictionary in the Status Manager 210 maps a Ticket checksum (i.e. a ticket identifier, ticketId) to a status object, which includes all status information about a particular work item. The second dictionary maps a client token (i.e., a requesterId or client requester identification) to the Ticket checksum (ticketId). This allows indexing into a status object using either a ticketId or a requesterId. An exemplary diagram of the logic for the state machine used by the Status Manager 210 is shown in FIG. 8.

The Status Manager 210 receives a new request for a ticket status. In this example, the ticket can have any of six statuses: pending, in-progress, pending-canceled, failed, in-progress-canceled, or completed. Initially, the status of a ticket is pending. When a work request is received, the status of the ticket is changed to in-progress, and when the calculation result has been completed, the status of the ticket is changed from in-progress to completed, and the Ticket Manager 206 removes the ticket from the Ticket Store 204. If a request to cancel the ticket is received while the ticket status is pending, the status of the ticket is changed to pending-canceled. A request to cancel the ticket can be reversed, reverting the ticket's status back to pending. If the ticket is canceled, the Ticket Manager 206 removes the ticket from the Ticket Store 204. While a ticket's status is in-progress, if an error occurs, for example a timeout limit is reached for completing the calculation, the ticket's status is changed to failed. Once in the failed state, the Ticket Manager 206 can resubmit the ticket to retry the calculation, in which case the ticket's status is changed back to pending and placed in the pending queue. Alternately, the Ticket Manager 206 can remove a failed ticket from the Ticket Store 204 and notify the client 110 of the removal and optionally the reason for the failure. While the calculation is being performed and the ticket's status is in-progress, a request to cancel the ticket can be made, changing the ticket's status to in-progress-canceled. For example, another Provider may have just completed the same calculation, and the ticket can be canceled to avoid duplicating the effort. The other Provider's result can be returned to the client, and the ticket's status can be changed to completed and then removed. A cancel request can be reversed, reverting the ticket back to in-progress status. If the ticket is canceled, the Ticket Manager 206 removes the canceled ticket from the Ticket Store 204.

The following exemplary code corresponds to an interface for submitting work requests, monitoring work status, and retrieving results.

```
/// <summary>
/// Shows the state of a request
///
/// Pending           = Request is in queue and has not been worked on yet
/// PendingCanceled   = Request in queue; not worked on yet, but has been canceled
/// InProgress        = Request removed from queue; being worked on by a PHS
/// InProgressCanceled = Request removed from queue; being worked on; has been canceled
/// Completed         = Request has been worked on and completed
/// Failed            = Request has been worked on, but failed for some reason
/// </summary>
public enum RequestState
{
    Pending,
    PendingCanceled,
    InProgress,
    InProgressCanceled,
    Completed,
    Failed
}
/// <summary>
/// This interface is used to submit work requests, monitor work status, and retrieve results
/// </summary>
public interface IClient
{
    /// <summary>
    /// Submits a new request into the Provider Engine.
    /// </summary>
    ///   <param name="calculationId">The identifier of the calculation to be performed</param>
    ///   <param name="payload">The payload of the ticket being submitted</param>
    ///   <param name="endpoint">Callback addr for caller; not impl for release 1</param>
    ///   <returns>Token unique to this request</returns>
    string SubmitRequest (int calculationId, string payload, Uri endpoint, int priority);
    /// <summary>
    /// Cancel notice for a request.
    /// </summary>
    ///   <param name="requestToken">Token of ticket to cancel</param>
    void CancelRequest (string requestToken);
    /// <summary>
    /// Requests the status of a ticket.
    /// </summary>
    ///   <param name="requestToken">Token of the request, received from SubmitRequest</param>
    ///   <returns>A structure containing the ticket status information</returns>
    WorkItemStatus GetRequestStatus (string requestToken);
    /// <summary>
    /// Requests the status of a ticket.
    /// </summary>
    ///   <param name="requestToken">Token of the ticket, received from SubmitRequest</param>
    ///   <returns>The RequestStatus structure serialized into a JSON string</returns>
    string GetRequestStatusString (string requestToken);
    /// <summary>
    /// Requests data from the Data Store for a particular ticket
    /// </summary>
    ///   <param name="requestToken">The id of the ticket the data request is about</param>
    string GetResults (string requestToken);
}
```

The Provider Service 100 can function as a stand-alone component. In a stand-alone deployment, the Provider Service 100 obtains its configuration information from a local configuration file or store. If deployed as part of an Application Modules system, it can obtain its configuration information directly from the Configuration Service.

The Provider Service 100 can be customizable in that the Provider Service 100 can load plug-in dynamic link libraries called Providers that customize and extend the types of available calculations.

While the components for the Provider Service 100 can be implemented using any known combination of platforms, frameworks, and interfaces, in the examples provided herein, the Provider Ticket Service 102 is wrapped by a Windows Communication Foundation (WCF) service 106. The WCF API allows client access to all public functionality of the Provider Ticket Service 102. The software framework for coding the components of the Provider Service 100 can be the MICROSOFT®.NET Framework using the Enterprise Library Cache Application Block.

Figure 10:
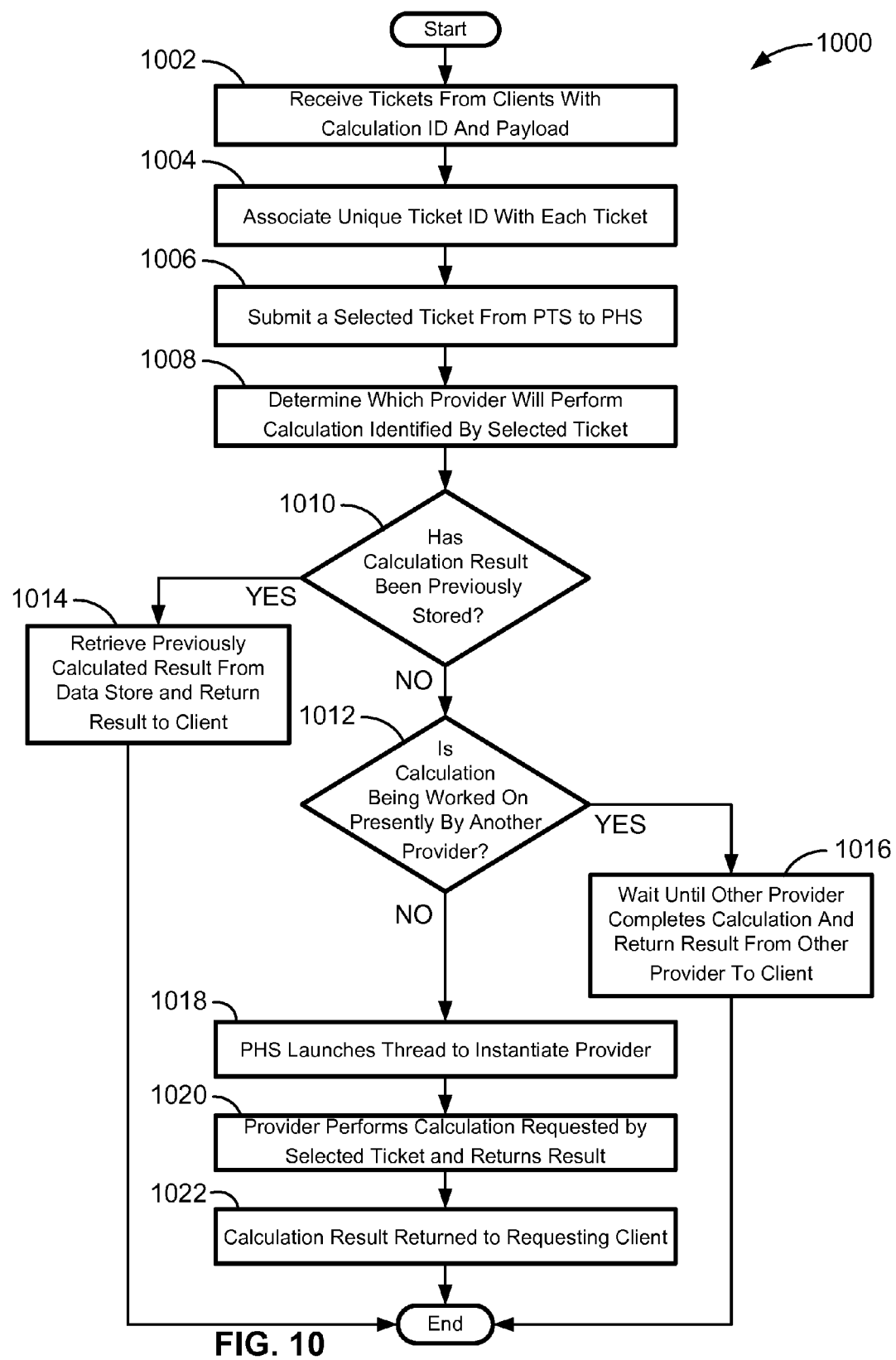
FIG. 10 is a flow chart diagram of an example algorithm used by the Provider Service shown in FIG. 1.

FIG. 10 is an example flow chart of an algorithm 1000 for performing the functions of the Provider Host 100 described herein. The algorithm 1000 is used for acquiring data and performing calculations on the data using a Provider Service 100, and the functions of the algorithm 1000 can be performed by the Provider Ticket Service 102 or the Provider Host Service 104 or both. The algorithm receives, at a provider ticket service 102, tickets from one or more clients 110 (1002). Each ticket includes a calculation identifier and a payload as described above. The calculation identifier identifies a calculation to be performed by a Provider 208, using information indicated in the payload of the ticket and optionally other information. Note that the form of the ticket passed from the client 110 to the Provider Ticket Service 102 is not necessarily an XML-formatted data structure. The information passed can include the calculation identifier and the payload, and together these are called a ticket. The Provider Ticket Service 102 formats and can embed additional information into the ticket after receiving the calculation identifier and the payload from the client 110. Thus, although the term "ticket" is used to refer to the information initially received by the client, it is understood that the ticket can be formatted and changed by removing or inserting additional data into the ticket as it is processed by the Provider Ticket Service 102 and Passed to the Provider Host Service 104.

The algorithm 1000 associates a unique ticket identifier (e.g., an MD5 checksum described above), with each of the tickets (1004). A Ticket Manager 206 of the Provider Ticket Service 102 submits a selected ticket from the PTS 102 to the PHS 104 (1006). The PTS 102 inspects the calculation identifier in the ticket to determine which provider or providers is to perform the calculation identified by the calculation identifier of the selected ticket (1008).

The algorithm 1000 determines whether the requested calculation indicated by the calculation identifier has already been performed and previously stored in the data store 200 (1010). If so, the PTS 102 retrieves the previously calculated result from the data store 200 and returns that previously calculated result to the requesting client 110 (1014). If not, the PTS 102 determines whether another provider is in the process of performing the calculation requested by the selected ticket (1012). If so, the PTS 102 waits for the other provider to perform the calculation, and when the other provider has returned the result of the calculation, the PTS 102 provides that result to the requesting client associated with the selected ticket (1016). Note that blocks 1010 and 1012 can be performed in any order.

If the requested calculation has not already been performed and is not being worked on currently, the PHS 104 launches a provider host thread 108 that invokes or instantiates the provider (1018) that performs the calculation identified by the calculation identifier of the selected ticket (1020). The PTS 102 receives from the PHS 104 a result of the calculation carried out by the invoked provider 108 (1020), and returns the result to the requesting client associated with the selected ticket (1022).

It should be noted that any of the algorithms illustrated and discussed herein, including the algorithm 1000, have various modules that perform particular functions and can interact with one another. It should be understood that these modules are merely segregated based on their function for the sake of description and represent computer hardware and/or executable software code which is stored on a non-transitory, computer-readable medium for execution on appropriate computing hardware. The various functions of the different modules and units can be combined or segregated as hardware and/or software stored on a computer-readable medium as above as modules in any manner, and can be used separately or in combination.

Furthermore, any of the algorithms disclosed herein include machine readable instructions for execution by: (a) a microprocessor, (b) a microcontroller, and/or (c) any other suitable processing device. It will be readily understood that the Provider Ticket Service 102 and the Provider Host Service 104 can be implemented on any one or more suitable processing device(s). Any algorithm, such as the algorithm 1000, disclosed herein can be embodied in software stored on a non-transitory, tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Although specific algorithms are described with reference to flowcharts or functional block diagrams depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The following table identifies examples of topical information that can be encoded in the topic identification (topicId) for various topical groups:

TABLE 1

| Group Name | Topic identification (separate topics delimited by commas or slashes) |
| --- | --- |
| Currents | Current, Avg Current, Max Current, % Load |
| Voltages | Voltage, Avg Voltage |
| Powers | Real/Reactive/Apparent Power, Fundamental Real/Reactive Power, Harmonic Real Power |
| Demand Readings | Demand Current, K-Factor Demand, Peak Demand Current, Coincident K-Factor Demand Peak, Coincident Current Demand Peak, Demand (Real/Reactive/Apparent) Power, Peak Demand (Real/Reactive/Apparent) Power, KW/KVAR/KVA Demand, Electric KW Demand Synch Pulse |
| Energies | Real/Reactive Energy Into/Out of Load, Apparent/Real/Reactive Energy, Conditional/Incremental Real/Reactive/Apparent Energy In/Out, Present Interval Incremental Real/Reactive/Apparent Energy In/Out, Electric Accumulated Energy |

TABLE 1-continued

| Group Name | Topic identification (separate topics delimited by commas or slashes) |
| --- | --- |
| Power Factors | Power Factor, Displacement Power Factor |
| Power Quality | THD/thd Current, THD/thd Voltage, K-Factor, Crest Factor, Harmonic Factor, Distortion Power Phase/Factor, Harmonic Current, Harmonic Voltage, Harmonic Voltage, Harmonic Voltage, Total Demand Distortion |
| Unbalance Readings | Current Unbalance, Voltage Unbalance |
| Fundamental Phasors | Fundamental Current Magnitude/Angle, Fundamental Voltage Magnitude/Angle |
| Minimum Readings | Minimum Temperature, Minimum Current, Minimum Voltage, Minimum Power Factor, Minimum Displacement Power Factor, Minimum Real/Reactive/Apparent Power Factor, Minimum THD/thd Current/Voltage, Minimum K-Factor, Minimum Crest Factor, Minimum Fundamental Real/Reactive Power, Minimum Harmonic Factor/Current/Voltage, Minimum Harmonic Real Power, Minimum Analog Input, Minimum Fundamental Current/Voltage, Minimum Distortion Power |
| Maximum Readings | Maximum Temperature, Maximum Current, Maximum Voltage, Maximum Power Factor, Maximum Displacement Power Factor, Maximum Real/Reactive/Apparent Power Factor, Maximum THD/thd Current/Voltage, Maximum K-Factor, Maximum Crest Factor, Maximum Fundamental Real/Reactive Power, Maximum Harmonic Factor/Current/Voltage, Maximum Harmonic Real Power, Maximum Analog Input, Maximum Fundamental Current/Voltage, Maximum Distortion Power |
| Ratings | Rated Ampacity, Rated Nominal Voltage, Rated KW/KVA/THD/Power Factor/KVAR, Rated Temperature, Rated User Defined Value |
| Demand Voltages | Demand Voltage, Min/Max Demand Voltage |
| Spectral Components | Meter Type, Voltage/Current Magnitude/Angle |
| Breaker/Trip Unit Status | Breaker Position, Trip Unit Door Status, Time Remaining to LT Trip, Remote Opening/Closing Enabled, Remote Control Enabled, Spring Charged, Breaker Ready to Close, Relay Module Status, Current Unbalance Alarm Status, Over-current Demand Alarm Status, Under/over-voltage Alarm Status, Reverse Power Alarm Status, Under/over Frequency Alarm Status, Phase Rotation Alarm Status, Load Shed Current Alarm Status, Load Shed Power Alarm Status, Current Unbalance Pre-Alarm Status |
| Cycle-by-Cycle | Cycle-by-cycle current, Cycle-by-cycle voltage |
| Trending | Meter Register Number, Scale Factor, 1-Minute/1-Hour/1-Day/1-Month Reading Last Second/Minute/Hour/Day/Month/Year, 1-Minute/1-Hour/1-Day/1-Month Statistics Avg Reading, Daily/Hourly Forecast Std Deviation/Avg Reading, Summary of Hourly/Weekly Statistics Avg/Min/Max/Std Dev |
| Input Metering | Consumption Units, Rate Units, Demand Last, Present Demand, Avg Demand Calc, Peak Demand, Cumulative Usage |
| Water | Water Flow, Water Flow Previous Day Total, Water Flow Current Day Total, Water Flow Incremental, Water Flow Rate, Water Flow Rate Min/Max/Hourly Average/Daily Average/Weekly Average/Monthly Average, Water Heat Flow, Water Heat Flow Min/Max/Hourly Avg/Daily Avg/Weekly Avg/Monthly Avg, Water Temperature Supply, Water Temperature Supply Min/Max/Hourly Avg/Daily Avg/Weekly Avg/Daily Avg, Water Temperature Return, Water Temperature Return Min/Max/Hourly Avg/Daily Avg/Weekly Avg/Daily Avg, Water Flow Rate, Water Flow Rate Min/Max/Hourly Avg/Daily Avg/Weekly Avg/Daily Avg, Sewage Flow Rate, Sewage Flow Rate Min/Max/Hourly Avg/Daily Avg/Weekly Avg/Daily Avg |
| Air | Air Pressure, Air Pressure Min/Max/Hourly Avg/Daily Avg/Weekly Avg/Daily Avg, Air Flow, Air Flow Min/Max/Hourly Avg/Daily Avg/Weekly Avg/Daily Avg, Air Temperature, Air Temperature Min/Max/Hourly Avg/Daily Avg/Weekly Avg/Daily Avg |
| Gas | Gas Flow, Gas Flow Min/Max/Hourly Avg/Daily Avg/Weekly Avg/Daily Avg, Gas Flow Rate, Gas Flow Rate Min/Max/Hourly Avg/Daily Avg/Weekly Avg/Daily Avg, Gas Temperature, Gas Temperature Min/Max/Hourly Avg/Daily Avg/Weekly Avg/Daily Avg, Gas Pressure, Gas Pressure Min/Max/Hourly Avg/Daily Avg/Weekly Avg/Daily Avg |

TABLE 1-continued

| Group Name | Topic identification (separate topics delimited by commas or slashes) |
| --- | --- |
| Steam | Steam Flow, Steam Flow Min/Max/Hourly Avg/Daily Avg/Weekly Avg/Daily Avg, Steam Flow Rate, Steam Flow Rate Min/Max/Hourly Avg/Daily Avg/Weekly Avg/Daily Avg, Steam Heat, Steam Heat Min/Max/Hourly Avg/Daily Avg/Weekly Avg/Daily Avg, Steam Temperature, Steam Temperature Min/Max/Hourly Avg/Daily Avg/Weekly Avg/Daily Avg, Steam Pressure, Steam Pressure Min/Max/Hourly Avg/Daily Avg/Weekly Avg/Daily Avg |
| Weather Station | Barometric Pressure, Barometric Pressure Min/Max/Hourly Avg/Daily Avg/Weekly Avg/Daily Avg, Dew Point, Dew Point Min/Max/Hourly Avg/Daily Avg/Weekly Avg/Daily Avg, Relative Humidity, Relative Humidity Min/Max/Hourly Avg/Daily Avg/Weekly Avg/Daily Avg, Wind Speed, Wind Speed Min/Max/Hourly Avg/Daily Avg/Weekly Avg/Daily Avg, Wind Direction, Temperature, Temperature Min/Max/Hourly Avg/Daily Avg/Weekly Avg/Daily Avg, Solar Radiation, Solar Radiation Min/Max/Hourly Avg/Daily Avg/Weekly Avg/Daily Avg, Precipitation, Precipitation Previous/Current Day Total |

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of acquiring data and performing calculations on a computer system using a provider service, comprising:
   receiving, at a provider ticket service implemented in a first process on the computer system, a plurality of tickets from one or more clients, each of the tickets including a calculation identifier and a payload, the calculation identifier identifying a calculation to be performed using at least information indicated in the payload of the ticket;
   associating a unique ticket identifier with each of the tickets received at the provider ticket service;
   submitting, by a ticket manager implemented in a second process on the computer system, a selected ticket from the provider ticket service to a provider host service implemented in a third process on the computer system;
   determining which one or more of a plurality of providers is to perform the calculation identified by the calculation identifier of the selected ticket;
   launching, by the provider host service, at least one provider host thread that invokes or instantiates the one or more providers determined to perform the calculation identified by the calculation identifier of the selected ticket;
   receiving at the provider ticket service from the provider host service a result of the calculation carried out by the invoked one or more providers; and
   returning the result to the requesting client associated with the selected ticket.

2. The method of claim 1, further comprising, prior to performing the calculation requested by the selected ticket, determining whether the calculation requested by the selected ticket has been performed already, and, if so, retrieving the previously calculated result and returning the previously calculated result as the result to be returned to the requesting client associated with the selected ticket.

3. The method of claim 1, further comprising, prior to performing the calculation requested by the selected ticket, determining whether another of the providers is in the process of performing the calculation requested by the selected ticket, and if so, waiting for the other provider to perform the calculation and provide the result and returning the result from the other provider as the result to be returned to the requesting client associated with the selected ticket.

4. The method of claim 1, further comprising:
   determining whether to store the result based on at least one criterion; and
   responsive to the at least one criterion being satisfied, storing the result in a data store of the provider ticket service.

5. The method of claim 4, wherein the at least one criterion includes whether the calculation requested by the selected ticket has been requested by at least one other of the clients.

6. The method of claim 4, wherein the at least one criterion includes a frequency with which the result is expected to be requested or has been requested.

7. The method of claim 4, wherein the at least one criterion includes whether data used to perform the calculation is within a predetermined time period.

8. The method of claim 1, further comprising:
   receiving, from the client that provided the first ticket, a request for the result using the ticket identifier associated with the first ticket; and
   responsive to receiving the request from the requesting client, querying the data store for the result.

9. The method of claim 1, further comprising inserting into the selected ticket a provider identification that identifies which of the one or more of providers is to be invoked for carrying out the calculation identified by the calculation identifier of the selected ticket.

10. The method of claim 1, further comprising:
   communicating to the client that communicated the selected ticket the ticket identifier associated with the selected ticket;
   receiving from the one or more clients a request for a status of the selected ticket;
   responsive to receiving the request for the status of the selected ticket, the provider ticket service querying a ticket status table for the status of the selected ticket; and
   the provider ticket service communicating, to the client that requested the status of the selected ticket, the status of the selected ticket, the status including an indication of whether processing of the selected ticket is pending or in-progress, and if the status of the selected ticket is in-progress, the ticket provider service further communicating an indication as to how much processing has been completed or remains to be completed to produce the result.

11. The method of claim 1, wherein the invoked provider carries out the calculation to be performed using input data hosted locally by the provider host service or externally to the provider host service based at least in further part on the local or external data.

12. The method of claim 1, further comprising:
the invoked provider requesting the information indicated in the payload of the ticket from a data store hosted by the provider ticket service or from a data service hosted external to the provider host service and to the provider ticket service; and
responsive to the invoked provider requesting the information, the invoked provider receiving input data from the data store or external data service and using the received input data to perform the calculation requested by the selected ticket.

13. The method of claim 1, further comprising:
storing, using a ticket manager, the tickets in a ticket store according to a queue;
identifying a status of each of the tickets and storing an indication of the status of each of the tickets, including the selected ticket, in a ticket status table;
increasing a pending ticket counter each time the status of selected ones of the tickets is identified as pending;
querying the ticket store for a first one of the tickets at the front of the queue; and
identifying from the first ticket at least a provider to be invoked from the plurality of providers for carrying out the calculation indicated by the calculation identifier of the first ticket.

14. The method of claim 13, further comprising, responsive to receiving the selected ticket at the provider ticket service, updating the status of the selected ticket in the ticket status table from pending to in-progress.

15. The method of claim 14, further comprising:
storing the result in a data store of the provider ticket service; and
responsive to storing the result in the data store of the provider ticket service, updating the status of the selected ticket in the ticket status table from in-progress to completed.

16. The method of claim 13, wherein each of at least some of the tickets further includes a priority field indicating a priority order of invocation relative to the other tickets, the first ticket including a higher priority order in the corresponding priority field compared to at least some of the other tickets.

17. The method of claim 1, further comprising:
receiving, at the provider ticket service, a request to cancel one of the tickets;
the provider ticket service determining which of the providers to notify based on provider identification information in the ticket to be canceled;
notifying the provider determined to be associated with the ticket to be canceled that the ticket to be canceled has received the request to cancel; and
canceling the ticket to be canceled.

18. The method of claim 1, wherein the payload includes a set of inputs or parameters needed to perform the calculation associated with the calculation identifier.

19. The method of claim 18, wherein the set of inputs or parameters includes a source identification indicating a source of at least some of the data needed to perform the calculation associated with the calculation identifier.

20. The method of claim 1, further comprising the provider host service notifying the provider ticket service how many provider host threads are available to perform calculations requested by the tickets.

21. The method of claim 1, wherein the launching the at least one provider host thread includes invoking a plurality of providers and chaining the plurality of providers together, some of the chained providers performing an intermediate calculation and producing an intermediate result to produce the result as the result to be returned to the requesting client associated with the selected ticket.

22. The method of claim 1, wherein the selected ticket includes a source identification, a topic identification, and a date or a date range, the source identification identifying a source of data used to perform the calculation identified by the calculation identifier of the selected ticket, the topic information identifying topical information about the data from the source identification, and the date or date range corresponding to a date or date range of the topical data from the source of the data.

23. The method of claim 22, wherein the selected ticket further includes a dependency identification associated with the source identification and the topic identification, the dependency identification having a unique value relative to dependency identifications associated with every other one of the tickets to permit multiple instances of the same source-topic combinations having the same source identification and the same topic identification.

24. The method of claim 23, wherein the dependency identification identifies one of a plurality of time-of-use (TOU) schedules, each of the TOU schedules being associated with the same source identification and the same topic identification, the calculation determining a time-of-use (TOU) pricing or an energy usage based on the TOU schedule identified by the dependency identification.

25. The method of claim 1, wherein the information includes values indicative of or calculated from a characteristic of a utility that is measured by one or more intelligent electronic devices in a utility system.

* * * * *